April 5, 1938. T. WHEATLEY 2,113,100
VALVE
Filed Nov. 18, 1935

Inventor
Thomas Wheatley
By Hardway Cathey
Attorneys

Patented Apr. 5, 1938

2,113,100

UNITED STATES PATENT OFFICE 2,113,100

VALVE

Thomas Wheatley, Houston, Tex.

Application November 18, 1935, Serial No. 50,429

2 Claims. (Cl. 251—127)

This invention relates to a valve.

An object of the invention is to provide a valve of the character described specially designed for use in pumps, but which is capable of general use.

Another object of the invention is to provide a valve of the character described in which the valve seat and the valve disc are so formed as to cooperate to form a fluid seal between them when the valve is closed.

Another object of the invention is to provide a valve of the character described wherein the liquid will be trapped, upon closing of the valve, to check the valve stroke whereby wear of the contacting parts is reduced and hammering of the valve is prevented.

A still further object of the invention is to provide a valve of novel construction whereby the opening movement of the valve disc is limited. The invention also embodies a novel type of valve disc which is readily reversible.

The invention further comprehends in a valve a novel type of disc which is annularly grooved on both sides and wherein each groove is provided with an annular pocket for the purpose hereinafter explained.

With the above and other objects in view, the invention has particular relation to certain novel features of construction, arrangement of parts, and use, an example of which is given in this specification and illustrated in the accompanying drawing wherein.

Figure 2:
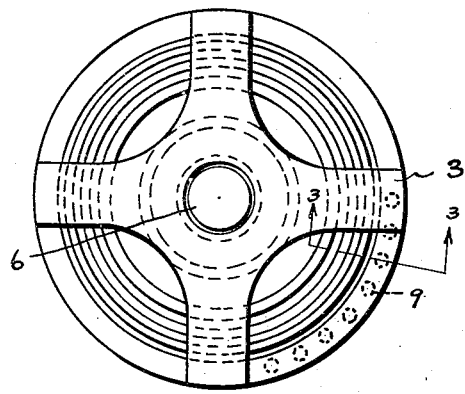
Figure 2 shows a plan view thereof.
Figure 3:
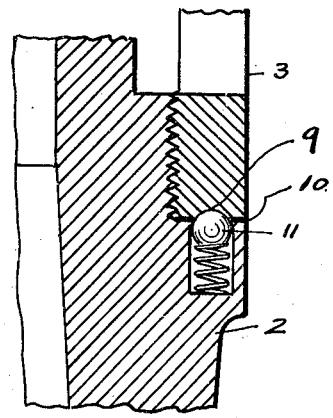
Figure 3 shows an enlarged fragmentary sectional view taken on the line 3—3 of Figure 2.
Figure 1:
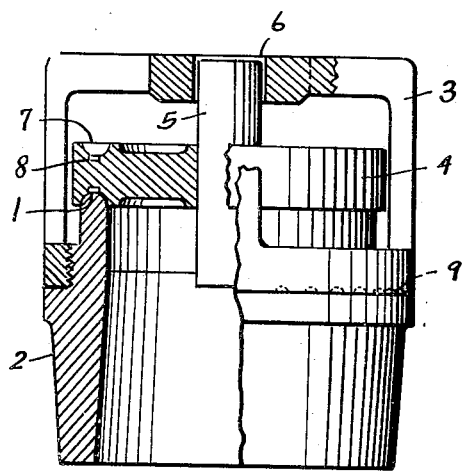
Figure 1 shows a side view of the valve, partly in section.

Referring now more particularly to the drawing wherein like numerals of reference designate similar parts in each of the figures, the numeral 1 designates the annular valve seat which is convex in cross-sectional contour and which upstands from the valve body 2. Screwed on to the valve body and surrounding the seat, there is a valve cage 3 the outer side of which is flush with the outer side of the body which is important in seating the valve mechanism in the pump where it is designed to be used. Within the cage there is the valve disc 4 which is fixed on the stem 5. The valve seats closely within the cage which forms a guide therefor. This stem extends above and beneath the valve disc 4 and works through the bearing 6 of the cage 3. The upper and lower sides of the disc are similar, each side being provided with an annular groove 7 which is concave in cross-sectional contour so as to accurately fit the seat 1 and each groove 7 has an annular pocket 8 at the bottom thereof. This pocket traps the liquid in it so as to form a better seal with the seat 1 when the disc is seated.

The lower margin of the cage 3 has the indentations 9 therein and located in the ledge 10 of the body 2, there is a spherical spring-seated detent 11 so arranged that when the cage is screwed home the detent will engage one of said indentations to hold the cage against unscrewing on account of the vibration but the cage can be unscrewed by a positive turning movement.

Upon downward stroke of the disc the liquid trapped in the pocket 8 on the under side of the disc will check the valve before it seats against the metal of the seat and will reduce the wear and hammering and a fluid-tight seal will be formed between the valve and seat. The cage is also so constructed as to limit the valve opening.

It is to be noted that the opposite sides of the disc as well as the opposite ends of the stem are identical so that the valve may be readily reversed.

The drawing and description disclose what is now considered to be a preferred form of the invention by way of illustration only, while the broad principle of the invention will be defined by the appended claims.

What I claim is:

1. A valve mechanism comprising an approximately cylindrical valve body whose upper end is reduced in diameter to form an annular seat which is integral with the body and which is convex in cross-sectional contour, a valve disc having an annular groove in each side which is concave in cross-sectional contour so as to accurately fit said seat, the bottom of each groove being provided with an annular pocket, a valve cage screwed on to the body and spaced outwardly from the reduced upper end of the body and provided with a bearing located axially with respect to the disc, the outer side of the cage being flush with the outer side of the body, a stem on which the disc is fixed, said stem extending each way from the disc and the upper end thereof being slidable through said bearing, the margin of the valve disc being in close proximity to the side arms of the cage to prevent lateral movement of the valve disc, said cage and stem forming means to maintain the groove in the under side of the disc in alignment with said seat.

2. A valve mechanism comprising an approximately cylindrical valve body whose upper end is reduced in diameter to form an annular seat which is integral with the body and which is convex in cross-sectional contour, a valve disc having annular grooves in its faces which are concave in cross-sectional contour so as to accurately fit said seat, the bottom of each groove being provided with an annular pocket, a valve cage screwed on to the body and spaced outwardly from the reduced upper end of the body and provided with a bearing located axially with respect to the disc, the outer side of the cage being flush with the outer side of the body, a stem on which the disc is fixed, said stem extending each way from the disc and the upper end thereof moving through said bearing, the margin of the valve disc being in close proximity to the side arms of the cage to prevent lateral movement of the disc, said cage and stem forming means to maintain the groove in the under side of the disc in alignment with said seat, the top portion of the cage being spaced from the seat a distance less than twice the thickness of the valve disc.

THOMAS WHEATLEY.